United States Patent
Klimke et al.

(10) Patent No.: US 11,339,277 B2
(45) Date of Patent: May 24, 2022

(54) HEAVY DUTY SUPPORT

(71) Applicants: ABU DHABI POLYMERS COMPANY LIMITED (BOROUGE) L.L.C., Abu Dhabi (AE); BOREALIS AG, Vienna (AT)

(72) Inventors: Katja Klimke, Linz (AT); Andrey Buryak, Linz (AT); Ashish Kumar, Abu Dhabi (AE)

(73) Assignees: ABU DHABI POLYMERS COMPANY LIMITED (BOROUGE) L.L.C., Abu Dhabi (AE); BOREALIS AG, Vienna (AT)

( * ) Notice: Subject to any disclaimer, the term of this patent is extended or adjusted under 35 U.S.C. 154(b) by 0 days.

(21) Appl. No.: 16/463,613

(22) PCT Filed: Nov. 23, 2017

(86) PCT No.: PCT/EP2017/080243
§ 371 (c)(1),
(2) Date: May 23, 2019

(87) PCT Pub. No.: WO2018/096047
PCT Pub. Date: May 31, 2018

(65) Prior Publication Data
US 2020/0181373 A1    Jun. 11, 2020

(30) Foreign Application Priority Data

Nov. 24, 2016    (EP) .................... 16200577

(51) Int. Cl.
| | | |
|---|---|---|
| *C08L 23/06* | (2006.01) | |
| *C08L 23/12* | (2006.01) | |
| *B29C 45/00* | (2006.01) | |
| *B29K 23/00* | (2006.01) | |
| *B29L 31/00* | (2006.01) | |
| *C08K 3/04* | (2006.01) | |

(52) U.S. Cl.
CPC .......... *C08L 23/06* (2013.01); *B29C 45/0001* (2013.01); *C08L 23/12* (2013.01); *B29K 2023/065* (2013.01); *B29K 2023/12* (2013.01); *B29L 2031/7178* (2013.01); *C08K 3/04* (2013.01); *C08L 2207/062* (2013.01)

(58) Field of Classification Search
CPC .... C08L 23/06; C08L 23/12; C08L 2205/025; C08L 2207/062; C08L 2031/7178; C08K 3/04; B29C 45/0001; B29K 2023/12; B29K 2023/065; B29L 2031/7178
See application file for complete search history.

(56) References Cited

U.S. PATENT DOCUMENTS

| | | | |
|---|---|---|---|
| 2003/0088021 A1 | 5/2003 | Van Dun et al. | |
| 2005/0261435 A1 | 11/2005 | Starita | |
| 2013/0160680 A1 | 6/2013 | Ten | |
| 2014/0275302 A1* | 9/2014 | Lightbody et al. ..... | C08L 23/12 521/88 |
| 2017/0008667 A1* | 1/2017 | Shuert ................ | B65D 19/0036 |
| 2017/0088309 A1* | 3/2017 | Tandy et al. ........... | B29C 45/16 |

FOREIGN PATENT DOCUMENTS

| | | |
|---|---|---|
| CN | 101022999 A | 8/2007 |
| CN | 101177508 A | 5/2008 |
| CN | 103421227 A | 12/2013 |
| EP | 0517868 A1 | 12/1992 |
| JP | 2003095268 A | 4/2003 |

OTHER PUBLICATIONS

"Studies on mechanical performance of wood-plastic composites: Polystyrene-Eucalyptus globulus Labill," Flores-Hernandez et al, Bioresources, Aug. 2017 pp. 6392-6404. (Year: 2017).*
"Physical and mechanical properties of wood plastic composites polystyrene-white oak wood flour," Flores-Hernandez et al, J. Comp. Mat., 2014, vol. 48(2) 209-217. (Year: 2014).*
International Search Report and Written Opinion dated Feb. 13, 2018 in International Application No. PCT/EP2017/080243 (12 pages).
Polyethylene HE3460, Product Data Sheet, Borogue, May 2015 (2 pages).
Polyethylene MB7581, Product Data Sheet, Borouge, Oct. 2016 (2 pages).

* cited by examiner

*Primary Examiner* — Irina S Zemel
(74) *Attorney, Agent, or Firm* — Meunier Carlin & Curfman LLC (57) ABSTRACT

A polymer composition comprising a blend of two or more high density polyethylenes: (A) a first high density polyethylene having a density of at least 940 kg/m³ and an $MFR_2$ of 0.25 g/10 min or less; and (B) a second high density polyethylene having a density of at least 940 kg/m³ and an $MFR_2$ of 1.0 g/10 min to 20 g/10 min; wherein said polymer composition has an $MFR_2$ of 0.25 to 15 g/10 min and wherein the components (A) and (B) combined form at least 91 wt % of said polymer composition.

20 Claims, 1 Drawing Sheet

HEAVY DUTY SUPPORT

This invention relates to heavy duty plastic supports such as plastic pallets comprising high density polyethylene. In particular, the invention relates to the use of a polymer composition comprising two high density polyethylenes of markedly different MFR to prepare a pallet which has remarkable crack resistance and load capability. The invention also relates to the polymer composition itself and its use in pallet manufacture.

BACKGROUND

Pallets are used around the globe to transport goods. Pallets enable easy lifting of goods onto and off trucks and are used in warehouses to store products. Pallets are conventionally moved using fork lift trucks and are therefore designed to allow the forks of the truck to penetrate the pallet. Pallets can come in a variety of sizes, with different standards being used in different parts of the World.

Historically, most pallets have been made of wood. Wooden pallets are cheap to manufacture but they have many limitations. Wooden pallets are prone to handling damage. Any damage can lead to weakness which can cause unstable pallet stacks and pallet collapse.

Wooden pallets are a splinter risk, and wooden splinters can often damage or enter the product being carried. Additionally, wooden pallets are hard to clean. It is hard to wash a wooden pallet so dirt on the pallet can readily contaminate the carried product. If a pallet gets wet, wood rots. Wooden pallets are potentially flammable. They can develop organic moulds which can be an environmental hazard. Customs in some countries like China are very sensitive to any potential health risk associated with old pallets and can blacklist vendors not complying with their health and safety requirements.

Wood is also a precious natural resource and some manufacturers might not source wood sustainably.

An alternative to wooden pallets is therefore a plastic pallet. Plastic pallets are often made of high density polyethylene (HDPE) or recycled polyethylene terephthalate (PET)(often drinks bottles). They are extremely durable, lasting for a hundred trips or more, and resist weathering, wet rot, chemicals and corrosion. Further benefits of plastic pallets over wooden pallets include the ability to be easily sanitized, resistance to odour, fire retardency, longer service life span, durability and better product protection, non-splintering, and lighter weight, thus saving on transportation costs and making them safer and more environmentally friendly in the long term. A further benefit is that microchips can be moulded into the pallets to monitor their location and track inventory.

Plastic pallets do however have a tendency to crack, in particular in cold temperatures. A further problem with plastic pallets is that they are more expensive than wooden pallets so are often used by logistics service providers who can profit from their durability and stackability. If a pallet has a tendency to crack, the economics of using plastic pallets is problematic as the pallet may crack before the user has had time to recoup the extra outlay over a wooden pallet.

Plastic pallets are not new. There are a number of patent applications on plastic pallets that concentrate on various designs of the actual pallet with no real discussion of the nature of the polymer material used to make the pallet. For example, US2013160680 mentions the option of using HDPE in pallet manufacture but is primarily concerned with pallet design.

CN101022999A concerns a load-carrying apparatus such as a pallet comprising: at least 10 wt % of a polymer, such as HDPE and at least 10 wt % of a mineral filler material such as silicate or carbonate. The pallets of the present case comprise low levels of filler.

In JP2003095268A (Nippon Plapallet Co., JP), a flame retardant plastic pallet is described comprising a polyolefin modified with an unsaturated carboxylic acid and a mixture containing (in weight parts) magnesium hydroxide (40-180) and a polypropylene resin (100) having a MFR of 10 or more and an Izod strength of 8 or more.

US2003/0088021 describes polymer blends which comprise an ethylene homopolymer having a Mw/Mn greater than about 2.5 and satisfying a particular inequality between density and melt index ($I_2$). It is suggested that those polymer blends are suitable for manufacturing a variety of moulded articles, including stackable plastic pallets.

US2005/0261435 describes HDPE compositions comprising at least two components, the blend having a Mn in the range from about 25,000 to about 50,000 g/mol. Those blends have good stress crack resistance (ASTM D5397) and are suggested as being particularly suitable for single and dual wall corrugated pipes applications.

The present inventors sought new materials for plastic pallets. In particular, the inventors sought new polymer compositions to improve the crack resistance of plastic pallets, i.e. to provide superior impact properties. The present inventors have surprisingly found that a particular polymer composition comprising two HDPEs of differing MFR creates a polymer composition that can be moulded to form excellent pallets. The overall MFR of the polymer composition is such that very advantageous cycle times are achievable. In particular, it has been found that the combination of two HDPEs of dissimilar MFR offers better protection against cracking.

The pallets of the invention possess very advantageous room temperature impact properties, resist cracking in drop tests and also have very feasible load carrying capability.

SUMMARY OF INVENTION

Viewed from one aspect the invention provides a polymer composition comprising a blend of two or more high density polyethylenes:
 (A) a first high density polyethylene having a density of at least 940 kg/m$^3$ and an MFR$_2$ of 0.25 g/10 min or less; and
 (B) a second high density polyethylene having a density of at least 940 kg/m$^3$ and an MFR$_2$ of 1.0 g/10 min to 20 g/10 min;
 wherein said polymer composition has an MFR$_2$ of 0.25 to 15 g/10 min and wherein the components (A) and (B) combined form at least 91 wt % of said polymer composition.

Viewed from another aspect the invention provides a polymer composition, comprising a blend of two or more HDPEs:
 (A) a first HDPE having a density of at least 940 kg/m$^3$ and an MFR$_2$ of 0.25 g/10 min or less; and
 (B) a second HDPE having a density of at least 940 kg/m$^3$ and an MFR$_2$ of 1.0 g/10 min to 20 g/10 min;
 wherein said polymer composition has an MFR$_2$ of 0.25 to 15 g/10 min and comprises less than 5 wt % of polypropylene and wherein components (A) and (B) combined form at least 80 wt % of said polymer composition.

In one embodiment, the polymer composition comprises less than 2.5 wt % polypropylene, such as less than 1.0 wt % polypropylene, preferably is free from polypropylene.

Viewed from another aspect the invention provides a polymer composition comprising a blend of two or more high density polyethylenes:

(A) a first high density polyethylene having a density of at least 940 kg/m$^3$ and an MFR$_2$ of 0.25 g/10 min or less; and (B) a second high density polyethylene having a density of at least 940 kg/m$^3$ and an MFR$_2$ of 1.0 g/10 min to 20 g/10 min;

wherein said polymer composition has an MFR$_2$ of 0.31 to 15 g/10 min and wherein the components (A) and (B) combined form at least 91 wt % of said polymer composition.

"HDPE" as used herein means high density polyethylene polymer.

Viewed from another aspect the invention provides a heavy duty support such as a pallet comprising a polymer composition as hereinbefore defined. Ideally, such a support, e.g. pallet, comprises at least 95 wt % of said polymer composition.

Viewed from another aspect the invention provides an article, preferably a moulded article comprising a polymer composition as hereinbefore defined.

Viewed from another aspect the invention provides a heavy duty support such as a pallet consisting of a polymer composition as hereinbefore defined.

Viewed from another aspect the invention provides an article, such as a moulded article, preferably a heavy duty support such as a pallet comprising a polymer composition as hereinbefore defined, said support comprising less than 5.0 wt % polypropylene, such as less than 2.5 wt % polypropylene, such as less than 1.0 wt % polypropylene, preferably is free from polypropylene.

Viewed from another aspect the invention provides an article, such as a moulded article, preferably a heavy duty support such as a pallet comprising at least 95 wt % of a polymer composition, wherein said polymer composition comprises, at least 95 wt % of a blend of two or more high density polyethylenes:

(A) a first high density polyethylene having a density of at least 940 kg/m$^3$ and an MFR$_5$ of 0.05 to 0.9 g/10 min; and (B) a second high density polyethylene having a density of at least 940 kg/m$^3$ and an MFR$_5$ of 5.0 g/10 min to 50 g/10 min;

wherein said polymer composition has an MFR$_2$ of 0.25 to 15 g/10 min.

Viewed from another aspect the invention provides a process for the preparation of an article, such as a moulded article, preferably a heavy duty support, such as a pallet as hereinbefore defined comprising blending components (A) and (B) to form a polymer composition as hereinbefore defined and moulding the polymer composition to prepare said article, e.g. moulded article, preferably a heavy duty support.

Viewed from another aspect the invention provides the use of a polymer composition as hereinbefore defined in the manufacture of an article, such as a moulded article, preferably a heavy duty support, such as a pallet.

DETAILED DESCRIPTION OF INVENTION

The present invention relates to the use of a polymer composition comprising two different high density polyethylenes (HDPEs) in the manufacture of a polymer composition for the manufacture of a heavy duty support such as for pallet manufacture. In particular, the composition of the invention comprises two HDPE grades of dissimilar MFR, which results in a composition which has remarkably enhanced crack resistance compared to a single HDPE alone or compared to a series of other possible polymer compositions exemplified below. The composition of the invention is highly suitable for use as a moulded article for heavy duty applications, preferably as a moulded support, like a pallet, for heavy weight loads.

Composition Properties

Any properties of the composition are measured in the presence of any additives that may be present. All required test methods are described in the test method section before the examples.

The composition of the invention preferably has a density according to ISO 1183 at 23° C. of at least 940 kg/m$^3$, preferably at least 945 kg/m$^3$, more preferably at least 950 kg/m$^3$, especially at least 952 kg/m$^3$. The upper limit for density may by 980 kg/m$^3$, preferably 975 kg/m$^3$, especially 970 kg/m$^3$. A highly preferred density range is 950 to 965 kg/m$^3$, such as 952 to 965 kg/m$^3$, more preferably 955 to 965 kg/m$^3$, especially 955 to 963 kg/m$^3$.

The MFR$_2$ according to ISO 1133 of the composition of the invention is in the range of 0.25 to 15 g/10 min, preferably 0.31 to 15 g/10 min, preferably 0.5 to 12.0 g/10 min, more preferably 0.3 to 6.0 g/10 min, such as 0.3 to 5.0 g/10 min, especially 0.4 to 4.0 g/10 min. In one embodiment, the optimum range is 4 to 11 g/10 min More preferably, the MFR$_2$ is 0.5 to 4.0 g/10 min.

In some embodiments the MFR$_2$ according to ISO 1133 of the composition of the invention is at least 0.35 g/10 min, preferably at least 0.4 g/10 min. Preferred values of MFR$_2$ for the composition are therefore 0.35 to 15 g/10 min or 0.4 to 15 g/10 min, such as 0.35 to 12.0 g/10 min or 0.4 to 12.0 g/10 min.

The polymer composition may have charpy impact strength of at least 8000 J/m$^2$, such as at least 9000 J/m$^2$. Ideally, the value should be at least 10,500 J/m$^2$. The maximum value might be 20,000 J/m$^2$.

The composition of the invention includes two high density polyethylene components, i.e. two components having a density of at least 940 kg/m$^3$. One or both of these components can be multimodal. Preferably both components are multimodal.

The term "multimodal" means herein, unless otherwise stated, multimodality with respect to molecular weight distribution and includes therefore a bimodal polymer. Usually, a polyethylene composition, comprising at least two polyethylene fractions, which have been produced under different polymerization conditions resulting in different (weight average) molecular weights and molecular weight distributions for the fractions, is referred to as "multimodal". The prefix "multi" relates to the number of different polymer fractions present in the polymer. Thus, for example, multimodal polymer includes so called "bimodal" polymer consisting of two fractions. The form of the molecular weight distribution curve, i.e. the appearance of the graph of the polymer weight fraction as a function of its molecular weight, of a multimodal polymer will show two or more maxima or is typically distinctly broadened in comparison with the curves for the individual fractions. For example, if a polymer is produced in a sequential multistage process, utilizing reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions form typically together a broadened molecular weight distribution curve for the total resulting polymer product.

The two HDPE components have markedly different MFR values. HDPE Component (A) has a lower $MFR_2$ than component (B).

High Density Multimodal Polyethylene Component A

Component (A) of the composition is preferably present in an amount of 10 to 70 wt %, such as 15 to 65 wt %, preferably 20 to 60 wt % of the composition.

The HDPE component (A) of the invention has a density according to ISO 1183 at 23° C. of at least 940 $kg/m^3$, preferably at least 945 $kg/m^3$. The upper limit for density may be 980 $kg/m^3$, preferably 975 $kg/m^3$, especially 970 $kg/m^3$. A highly preferred density range is 945 to 965 $kg/m^3$, especially 955 to 965 $kg/m^3$.

The $MFR_2$ according to ISO 1133 of the HDPE component (A) is less than 0.25 g/10 min, preferably less than 0.1 g/10 min.

The $MFR_5$ according to ISO 1133 of the HDPE component (A) is preferably 0.05 to 0.9 g/10 min, such as 0.1 to 0.8 g/10 min.

Component (A) preferably has a $M_w$ of at least 70,000 g/mol, more preferably at least 120,000 g/mol. The Mw of the Component (A) should be less than 400,000 g/mol, preferably less than 300,000 g/mol.

Component (A) preferably has a $M_w/M_n$ of 3 to 10.

In all embodiments of the invention, it is preferable if component (A) is a multimodal HDPE comprising at least (i) a lower weight average molecular weight (LMW) ethylene homopolymer or copolymer component, and (ii) a higher weight average molecular weight (HMW) ethylene homo or copolymer component.

Said LMW component of multimodal polymer (A) preferably has a $MFR_2$ of at least 5 g/10 min, preferably at least 50 g/10 min, more preferably at least 100 g/10 min.

The density of LMW component of said multimodal polymer (A) may range from 950 to 980 $kg/m^3$, e.g. 950 to 970 $kg/m^3$.

The LMW component of said multimodal polymer (A) preferably forms from 30 to 70 wt %, e.g. 40 to 60% by weight of the multimodal polymer (A) with the HMW component forming 70 to 30 wt %, e.g. 60 to 40% by weight. In one embodiment said LMW component forms 50 wt % or more of the multimodal polymer (A) as defined above or below. Typically, the LMW component forms 45 to 55% and the HMW component forms 55 to 45% of the polymer composition.

The HMW component of said multimodal ethylene polymer (A) has a lower $MFR_2$ than the LMW component.

The multimodal ethylene polymer of the invention may be an ethylene homopolymer or copolymer. By ethylene homopolymer is meant a polymer which is formed essentially only ethylene monomer units, i.e. is 99.9 wt % ethylene or more. It will be appreciated that minor traces of other monomers may be present due to industrial ethylene containing trace amounts of other monomers.

The multimodal ethylene polymer (A) of the invention may also be a copolymer (and is preferably a copolymer) and can therefore be formed from ethylene with at least one other comonomer, e.g. $C_{3-20}$ olefin. Preferred comonomers are alpha-olefins, especially with 3-8 carbon atoms. Preferably, the comonomer is selected from the group consisting of propene, 1-butene, 1-hexene, 4-methyl-1-pentene, 1-octene, 1,7-octadiene and 7-methyl-1,6-octadiene. The use of 1-hexene or 1-butene is most preferred.

The multimodal ethylene polymer (A) can comprise one monomer or two monomers or more than 2 monomers. The use of a single comonomer is preferred. If two comonomers are used it is preferred if one is a $C_{3-8}$ alpha-olefin and the other is a diene as hereinbefore defined.

The amount of comonomer is preferably such that it comprises 0-3.0 mol %, more preferably 0.1-2.0 mol % and most preferably 0.1-1.5 mol % of the ethylene polymer (A). Values under 1.0 mol % are also envisaged, e.g. 0.1 to 1.0 mol %. These can be determined by NMR.

It is preferred however if the ethylene polymer (A) comprises a LMW homopolymer component and a HMW ethylene copolymer component, e.g. an ethylene hexene copolymer or an ethylene butene copolymer. Hence, it is preferred if component (A) contains comonomer in the HMW component only.

For the preparation of the multimodal HDPE (A) polymerisation methods well known to the skilled person may be used. It is within the scope of the invention for a multimodal, e.g. at least bimodal, polymers to be produced by blending each of the components in-situ during the polymerisation process thereof (so called in-situ process) or, alternatively, by blending mechanically two or more separately produced components in a manner known in the art.

Polyethylenes useful in the present invention is preferably obtained by in-situ blending in a multistage polymerisation process. Accordingly, polymers are obtained by in-situ blending in a multistage, i.e. two or more stage, polymerization process including solution, slurry and gas phase process, in any order. Whilst it is possible to use different single site catalysts in each stage of the process, it is preferred if the catalyst employed is the same in both stages.

Ideally therefore, the polyethylene polymer used in the polymer composition of the invention are produced in at least two-stage polymerization using a single site catalyst or Ziegler Natta catalyst. Thus, for example two slurry reactors or two gas phase reactors, or any combinations thereof, in any order can be employed. Preferably however, the polyethylene is made using a slurry polymerization in a loop reactor followed by a gas phase polymerization in a gas phase reactor.

A loop reactor—gas phase reactor system is well known as *Borealis* technology, i.e. as a BORSTAR™ reactor system. Such a multistage process is disclosed e.g. in EP517868.

The conditions used in such a process are well known. For slurry reactors, the reaction temperature will generally be in the range 60 to 110° C., e.g. 85-110° C., the reactor pressure will generally be in the range 5 to 80 bar, e.g. 50-65 bar, and the residence time will generally be in the range 0.3 to 5 hours, e.g. 0.5 to 2 hours. The diluent used will generally be an aliphatic hydrocarbon having a boiling point in the range −70 to +100° C., e.g. propane. In such reactors, polymerization may if desired be effected under supercritical conditions. Slurry polymerisation may also be carried out in bulk where the reaction medium is formed from the monomer being polymerised.

For gas phase reactors, the reaction temperature used will generally be in the range 60 to 115° C., e.g. 70 to 110° C., the reactor pressure will generally be in the range 10 to 25 bar, and the residence time will generally be 1 to 8 hours. The gas used will commonly be a non-reactive gas such as nitrogen or low boiling point hydrocarbons such as propane together with monomer, e.g. ethylene. Preferably, the first polymer fraction is produced in a continuously operating loop reactor where ethylene is polymerised in the presence of a polymerization catalyst as stated above and a chain transfer agent such as hydrogen. The diluent is typically an inert aliphatic hydrocarbon, preferably isobutane or propane. The reaction product is then transferred, preferably to continuously operating gas phase reactor. The second component can then be formed in a gas phase reactor using preferably the same catalyst.

It is preferred that HDPE Component (A) is produced using a Ziegler-Natta catalyst.

The HDPEs of the composition of the invention are commercial products and can be purchased from various suppliers.

HDPE Component (B)

Component (B) of the composition is preferably present in an amount of 30 to 90 wt %, such as 35 to 85 wt %, preferably 40 to 80 wt % of the composition.

The HDPE component (B) of the invention has a density according to ISO 1183 at 23° C. of at least 940 kg/m$^3$, preferably at least 945 kg/m$^3$. The upper limit for density may be 980 kg/m$^3$, preferably 975 kg/m$^3$, especially 970 kg/m$^3$. A highly preferred density range is 945 to 965 kg/m$^3$, especially 955 to 965 kg/m$^3$.

The MFR$_2$ according to ISO 1133 of the HDPE component (B) is 1.0 to 20 g/10 min, preferably 2.0 to 10 g/10 min, more preferably 2.0 to 8.0 g/10 min, such as 2.0 to 6.0 g/10 min.

The MFR$_5$ according to ISO 1133 of the HDPE component (B) is preferably 5.0 to 40 g/10 min, such as 10 to 25 g/10 min.

Component (B) preferably has a M$_w$ of at least 70,000 g/mol, more preferably at least 120,000 g/mol. The Mw of the Component (B) should be less than 400,000 g/mol, preferably less than 300,000 g/mol.

Component (B) may have a Mw/Mn of 3 to 10.

In all embodiments of the invention, it is preferable if component (B) is a multimodal HDPE comprising at least (i) a lower weight average molecular weight (LMW) ethylene homopolymer or copolymer component, and (ii) a higher weight average molecular weight (HMW) ethylene homo or copolymer component.

Said LMW component of multimodal polymer (B) preferably has a MFR$_2$ of at least 5 g/10 min, preferably at least 50 g/10 min, more preferably at least 100 g/10 min.

The density of LMW component of said multimodal polymer (B) may range from 950 to 980 kg/m$^3$, e.g. 950 to 970 kg/m$^3$.

The LMW component of said multimodal polymer (B) preferably forms from 30 to 70 wt %, e.g. 40 to 60% by weight of the multimodal polymer (B) with the HMW component forming 70 to 30 wt %, e.g. 60 to 40% by weight. In one embodiment said LMW component forms 50 wt % or more of the multimodal polymer (B) as defined above or below. Typically, the LMW component forms 45 to 55% and the HMW component forms 55 to 45% of the polymer composition.

The HMW component of said multimodal ethylene polymer (B) has a lower MFR$_2$ than the LMW component.

The multimodal ethylene polymer (B) of the invention may be an ethylene homopolymer or copolymer. By ethylene homopolymer is meant a polymer which is formed essentially only ethylene monomer units, i.e. is 99.9 wt % ethylene or more. It will be appreciated that minor traces of other monomers may be present due to industrial ethylene containing trace amounts of other monomers.

The multimodal ethylene polymer of the invention may also be a copolymer (and is preferably a copolymer) and can therefore be formed from ethylene with at least one other comonomer, e.g. C$_{3-20}$ olefin. Preferred comonomers are alpha-olefins, especially with 3-8 carbon atoms. Preferably, the comonomer is selected from the group consisting of propene, 1-butene, 1-hexene, 4-methyl-1-pentene, 1-octene, 1,7-octadiene and 7-methyl-1,6-octadiene. The use of 1-hexene or 1-butene is most preferred.

The multimodal ethylene polymer (B) of the invention can comprise one monomer or two monomers or more than 2 monomers. The use of a single comonomer is preferred. If two comonomers are used it is preferred if one is a C$_{3-8}$ alpha-olefin and the other is a diene as hereinbefore defined.

The amount of comonomer is preferably such that it comprises 0-3.0 mol %, more preferably 0.1-2.0 mol % and most preferably 0.1-1.5 mol % of the ethylene polymer. Values under 1.0 mol % are also envisaged, e.g. 0.1 to 1.0 mol %. These can be determined by NMR.

It is preferred however if the ethylene polymer (B) comprises a LMW homopolymer component and a HMW ethylene copolymer component, e.g. an ethylene hexene copolymer or an ethylene butene copolymer. Hence, it is preferred if component (B) contains comonomer in the HMW component only. It is also preferred if the comonomer content of component (B) is less than component (A).

Component (B) can be prepared following the protocols for component (A) above. The HMW component in polymer (B) is ideally produced in the gas phase.

It is preferred that HDPE Component (B) is produced using a Ziegler-Natta catalyst.

Other Composition Components

It will be appreciated that the composition of the invention may also comprise (C) additives known in the art, e.g. in the form of masterbatches. The composition may therefore contain the carrier polymers of such additive masterbatches. The properties of the composition will be preferably measured in the presence of any additives that are present. In case of the masterbatch of an additive(s) the carrier polymer is calculated to the amount of the respective additive(s) based on the amount (100%) of the composition of the invention. The term "additives" as used herein excludes carbon black products.

Suitable additives (C)

Suitable antioxidants and stabilizers as additives (C) are, for instance, sterically hindered phenols, phosphates or phosphonites, sulphur containing antioxidants, alkyl radical scavengers, aromatic amines, hindered amine stabilizers and the blends containing compounds from two or more of the above-mentioned groups.

Examples of sterically hindered phenols as additives (C) are, among others, 2,6-di-tert-butyl-4-methyl phenol (sold, e.g., by Degussa under a trade name of Ionol CP), pentaerythrityl-tetrakis(3-(3',5'-di-tert. butyl-4-hydroxyphenyl)-propionate (sold, e.g., by Ciba Specialty Chemicals under the trade name of Irganox 1010) octadecyl-3-3(3'5'-di-tert-butyl-4'-hydroxyphenyl)propionate (sold, e.g., by Ciba Specialty Chemicals under the trade name of Irganox 1076) and 2,5,7,8-tetramethyl-2(4',8',12'-trimethyltridecyl)chroman-6-ol (sold, e.g., by BASF under the trade name of Alpha-Tocopherol).

Examples of phosphates and phosphonites as additives (C) are tris (2,4-di-t-butylphenyl) phosphite (sold, e.g., by Ciba Specialty Chemicals under the trade name of Irgafos 168), tetrakis-(2,4-di-t-butylphenyl)-4,4'-biphenylen-di-phosphonite (sold, e.g., by Ciba Specialty Chemicals under the trade name of Irgafos P-EPQ) and tris-(nonylphenyl) phosphate (sold, e.g., by Dover Chemical under the trade name of Doverphos HiPure 4).

Examples of sulphur-containing antioxidants as additives (C) are dilaurylthiodipropionate (sold, e.g., by Ciba Specialty Chemicals under the trade name of Irganox PS 800), and distearylthiodipropionate (sold, e.g., by Chemtura under the trade name of Lowinox DSTDB).

Examples of nitrogen-containing antioxidants as additives (C) are 4,4'-bis(1,1'-dimethylbenzyl)diphenylamine (sold, e.g., by Chemtura under the trade name of Naugard 445), polymer of 2,2,4-trimethyl-1,2-dihydroquinoline (sold, e.g., by Chemtura under the trade name of Naugard EL-17), p-(p-toluene-sulfonylamido)-diphenylamine (sold, e.g., by Chemtura under the trade name of Naugard SA) and N,N'-diphenyl-p-phenylene-diamine (sold, e.g., by Chemtura under the trade name of Naugard J).

Commercially available blends of antioxidants and process stabilizers as additives (C) are also available, such as Irganox B225, Irganox B215 and Irganox B561 marketed by Ciba-Specialty Chemicals.

Suitable acid scavengers as additives (C) are, for instance, metal stearates, such as calcium stearate and zinc stearate. They are used in amounts generally known in the art, typically from 500 ppm to 10000 ppm and preferably from 500 to 5000 ppm.

In one embodiment, the polymer composition comprises, preferably consists of, components (A) and (B) as herein defined and optionally one or more of, (C) additives, (D) carbon black product and (E) other polymer components. The polymer composition should still have an $MFR_2$ of 0.25 to 15 g/10 min and components (A) and (B) combined form at least 91 wt % of said polymer composition.

The carbon black product (D) can be neat or in form of masterbatch wherein carbon black is added together with a carrier polymer. The carrier polymer of the optional masterbatch of carbon black is calculated to the amount of the carbon black product based on the amount (100%) of the composition of the invention. The optional other polymer components (E) different from component (A) and (B) preferably comprise less than 5 wt % of polypropylene. The polymer composition is preferably free of polypropylene component(s).

Preferably, the composition comprises, preferably consists of, components (A), (B), optional additives (C) and optional carbon black product (D). More preferably, the composition comprises, preferably consists of, components (A), (B), additives (C) and carbon black product (D).

Carbon black product (D) is a generally used as pigment, which also acts as an UV-screener. The carbon black product can be added as neat or, typically, as a masterbatch where it is premixed with a carrier polymer, herein preferably high density polyethylene (HDPE). As said earlier, the carrier polymer of the optional masterbatch of optional, and preferable, carbon black product (D) is calculated to the total amount of carbon black product (D) based on the amount (100%) of the composition of the invention.

It is particular preferred therefore if carbon black product is present in the polymer compositions of the invention. In particular, carbon black product (D) may be present within component (A) and/or component (B), or added separately to the composition. Preferably the carbon black product (D), if present, is present in component (A).

The total amount of the optional, and preferable, additives (C) (including the weight of any masterbatch carrier polymer) present in the composition of the invention is up to 5.0 wt %, such as up to 4.0 wt %, preferably up to 2.0 wt %, especially up to 1.0 wt %. The amount of additives (C) may be in the range 0.05 to 5 wt %, such as 0.1 to 4.0 wt %.

The total amount (including the weight of any masterbatch carrier polymer) of the optional, and preferable, carbon black product (D) in the polymer composition of the invention is 0.1 to 13.0 wt.-% of a carbon black product, preferably 0.2 to 9.0 wt %, preferably 0.25 to 8.0 wt.-%, still more preferably from 0.25 to 7.0 wt.-% and most preferably from 0.4 to 6.0 wt.-%.

It is possible to use a component (A) free of additives (C) and combine that with a component (B) in which all the necessary additives (C) are present or vice versa. It is also possible for both components (A) and (B) to contain additives (C). Additives (C) can therefore be present in component (A) and/or (B). Part or all of the additives (C) may also be added during the blending of components (A) and (B). The skilled person can devise suitable ways to introduce additives into the claimed composition.

Similarly the carbon black product (D) can be present in one or both of component (A) and (B) before blending the components of the composition of the invention, or all or part of the carbon black product (D) can be added during the blending of components (A) and (B).

Components (A) and (B) in the polymer blend of the invention can be further blended with (E) any other polymer of interest. Thus, the polymer composition of the invention can be blended with other known HDPE, medium density polyethylene (MDPE), low density polyethylene (LDPE), linear low density polyethylene (LLDPE) polymers or polypropylene polymers. It is however preferred if the polymer composition comprises less than 5.0 wt % of polypropylene, such as no polypropylene. The term polypropylene refers to a homopolymer of propylene or copolymer of propylene in which propylene is the most abundant comonomer present.

It is to be understood that amounts of components (A), (B), and optional (C), (D) and (E), as given above, below or in claims are based on the final amount (100 wt %) of the polymer composition.

In one embodiment, the composition of the invention comprises, preferably consists of,
(A) 10 to 70 wt % of a first high density polyethylene having a density of at least 940 kg/m³ and an $MFR_2$ of 0.25 g/10 min or less; and
(B) 30 to 90 wt % of a second high density polyethylene having a density of at least 940 kg/m³ and an $MFR_2$ of 1.0 g/10 min to 20 g/10 min; and
(C) 0 to 5 wt % additives, such as 0.05 to 5 wt %, of additives;
wherein said polymer composition has an $MFR_2$ of 0.25 to 15 g/10 min and wherein the components (A) and (B) combined form at least 91 wt % of said polymer composition.

In another embodiment, the composition of the invention comprises, preferably consists of,
(A) 10 to 70 wt % of a first high density polyethylene having a density of at least 940 kg/m³ and an $MFR_2$ of 0.25 g/10 min or less; and
(B) 30 to 90 wt % of a second high density polyethylene having a density of at least 940 kg/m³ and an $MFR_2$ of 1.0 g/10 min to 20 g/10 min;
(C) 0 to 5 wt % additives, such as 0.05 to 5 wt %, of additives; and
(D) 0 to 9 wt % carbon black product (D);
wherein said polymer composition has an $MFR_2$ of 0.25 to 15 g/10 min and wherein the components (A) and (B) combined form at least 91 wt % of said polymer composition.

Preferably there is 0.2 to 9.0 wt % of carbon black product (D) present in the polymer composition, thus preferably in said above another embodiment embodiment, the composition of the invention comprises, preferably consists of,
- (A) 10 to 70 wt % of a first high density polyethylene having a density of at least 940 kg/m$^3$ and an MFR$_2$ of 0.25 g/10 min or less; and
- (B) 30 to 90 wt % of a second high density polyethylene having a density of at least 940 kg/m$^3$ and an MFR$_2$ of 1.0 g/10 min to 20 g/10 min;
- (C) 0 to 5 wt % additives, such as 0.05 to 5 wt %, of additives; and
- (D) 0.2 to 9.0 wt % carbon black product (D);

wherein said polymer composition has an MFR$_2$ of 0.25 to 15 g/10 min and wherein the components (A) and (B) combined form at least 91 wt % of said polymer composition.

In one embodiment, the composition of the invention comprises, preferably consists of,
- (A) 10 to 70 wt % of a first high density polyethylene having a density of at least 940 kg/m$^3$ and an MFR$_2$ of 0.25 g/10 min or less; and
- (B) 30 to 90 wt % of a second high density polyethylene having a density of at least 940 kg/m$^3$ and an MFR$_2$ of 1.0 g/10 min to 20 g/10 min;
- (C) 0 to 5 wt % additives, such as 0.05 to 5 wt %, of additives;
- (D) 0 to 9 wt % carbon black product (D); and
- (E) 0 to 5 wt % of polymers (other than polymer (A) and (B));

wherein said polymer composition has an MFR$_2$ of 0.25 to 15 g/10 min and wherein the components (A) and (B) combined form at least 91 wt % of said polymer composition.

In a further embodiment, the composition of the invention comprises, preferably consists of,
- (A) 10 to 70 wt % of a first high density polyethylene having a density of at least 940 kg/m$^3$ and an MFR$_2$ of 0.25 g/10 min or less; and
- (B) 30 to 90 wt % of a second high density polyethylene having a density of at least 940 kg/m$^3$ and an MFR$_2$ of 1.0 g/10 min to 20 g/10 min;
- (C) 0.1 to 4.0 wt % additives; and
- (D) 0.5 to 9.0 wt % carbon black product (D);

wherein said polymer composition has an MFR$_2$ of 0.25 to 15 g/10 min and wherein the components (A) and (B) combined form at least 91 wt % of said polymer composition.

Preferably the polymer composition of the invention comprises less than 5 wt % of polypropylene. The polymer composition is preferably free of polypropylene component(s).

In a preferred embodiment the percentages of components (A) to (E) sum to 100% of the composition.

Ideally, the only olefinic components present, other than masterbatch carrier polymers, are the two HDPE components (A) and (B). The polymer composition therefore preferably consists essentially of components (A) and (B), i.e. these components and any additives (C) and/or carbon black product (D) only.

It is preferred if components (A) and (B) combined comprise at least 85 wt % of the polymer composition, such as at least 90 wt %, preferably at least 91 wt %, such as at least 95 wt % of the polymer composition, such as at least 96 wt % of the polymer composition.

The HDPEs of use in the invention are not modified through reaction with carboxylic groups.

The polymer composition is ideally free of magnesium hydroxide. The polymer composition can be used in the manufacture of an article, in particular a moulded article. Preferably, the polymer composition is used in the manufacture of any heavy duty moulded article, such as one that acts as a support for carrying goods. In particular, the composition can be formed into a pallet.

Pallet

The pallet of the invention preferably comprises at least 80 wt % of the polymer composition, such as at least 85 wt %, preferably at least 90 wt %, especially at least 95 wt % of the polymer composition. In a preferred embodiment, the pallet consists of the polymer composition of the invention. In this context, the term consists of refers to the material used to mould the pallet in a conventional moulding process. After moulding, pallets may be treated in some way or have rubber grommets applied etc. The addition of these parts is not excluded by the consisting of wording. Where the pallet comprises the polymer composition therefore is meant that the pallet is moulded using that composition.

The pallet of the invention can be of any conventional design or size. The present invention does not relate to the design of the pallet or its size rather the invention concerns the nature of the polymer composition employed in the manufacture of the pallet and the improvements this composition offers in terms of pallet crack resistance and ultimate load.

Typically, pallets have dimensions of 800 to 1400 mm along the sides. Pallets can be square or rectangular in cross section. A conventional European pallet is 800 by 1200 mm or 1100 by 1300 mm.

Such pallets can typically carry up to 4000 kg static load or around 1500 kg in dynamic load.

The invention is also of use in the manufacture of mini pallets whose dimensions are often 300 to 400 mm along the sides.

Pallets may have a thickness of 10 to 30 cm such as around 15 cm. The pallet is obviously designed to allow the forks of a fork lift to penetrate the pallet and hence carry the pallet. Ideally, the pallets can be approached from any of the 4 sides and be carried.

Pallets may weigh between 7 to 20 kg, such as 12 to 18 kg or 8 to 12 kg. We generally observe that pallets can come in a variety of sizes, with different standards being used in different parts of the World. The polymer composition of the invention can be used to make a pallet of any size. The use of moulds enables pallets of intricate design to be developed. Again, the composition of the invention can be used with any design.

Pallets can be manufactured using known processes. Suitable moulding techniques known to the skilled person can be used such as injection moulding or rotomoulding. Pallets are most preferably made by injection moulding, however the specific method including devices, processing conditions and so on is not critical for the present invention and techniques are familiar to the person skilled person in the art. Pallets are typically double deck and are constructed in a one piece mould.

Pallets designated PP7 or PP9 are possible. Pallets can be provided with rubber grommets to increase friction on the pallet surface and prevent material falling from the pallet.

An important aspect of the invention is that the pallets do not crack when dropped. As shown in the examples section, when dropped from a height onto a solid concrete floor at warehouse temperature, the pallets of the invention did not crack whereas all the pallets of the comparative examples cracked. The composition of the invention is therefore remarkable as it unexpectedly prevents cracking. This is vital as a limitation of plastic pallets is their tendency to crack if dropped. As the plastic pallet is more expensive than a wooden pallet, it is important that the plastic pallet endures to enable the user to recoup the extra cost of its purchase. Cracked pallets are dangerously weakened and have to be thrown away. Pallets that are easily cracked offer limited commercial appeal therefore.

Pallets of the invention resist cracking when dropped once from a height 1.0 m on a corner on a concrete floor at room temperature.

Pallets of the invention resist cracking when dropped once on their longest edge from a height of 3 m onto a concrete floor at room temperature.

The polymer composition of the invention has mechanical properties, such as resistance to cracking, which are ideal for heavy duty plastic supports, like pallets.

The crack resistance is for instance illustrated with Edge Test as shown in experimental part when determined as described below under "Analytical Test".

Furthermore, the pallets of the invention preferably fulfil the requirements, such as the corner drop (from 0.5 m height), static load, dynamic load and top deck stack compress test as given in standard EN ISO 8611-(1-3) (2012) for plastic pallets, e.g. when measured using pallets with type and dimensions as given in experimental part for Edge Test.

Pallets of the invention can be produced with industrially very feasible cycle times. It will be appreciated that pallets are made in a continuous process. The cycle time is the time taken from the start of pallet manufacture to the start of the manufacture of the next pallet in the continuous process.

The invention will now be described with reference to the following non-limiting figures and examples.

BRIEF DESCRIPTION OF THE FIGURES

The FIGURE demonstrates the Edge Test as described below.

ANALYTICAL TESTS

Melt Flow Rate

The melt flow rate (MFR) is determined according to ASTM D1238 and is indicated in g/10 min. The MFR is an indication of the melt viscosity of the polymer. The MFR is determined at 190° C. for polyethylene. The load under which the melt flow rate is determined is usually indicated as a subscript, for instance $MFR_2$ is measured under 2.16 kg load, $MFR_5$ is measured under 5 kg load or $MFR_{21}$ is measured under 21.6 kg load.

Density

Density of the polymer was measured according to ISO 1183-1:2004 Method A on compression moulded specimen prepared according to EN ISO 1872-2 (February 2007) and is given in kg/m³.

Molecular Weight $M_w$, $M_n$ and MWD are measured by Gel Permeation Chromatography (GPC) according to the following method:

The weight average molecular weight $M_w$ and the molecular weight distribution (MWD=$M_w/M_n$, wherein $M_n$ is the number average molecular weight and $M_w$ is the weight average molecular weight) is measured according to ISO 16014-4:2003 and ASTM D 6474-99. A Waters GPCV2000 instrument, equipped with refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/L 2,6-Di tert-butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants were used as given in ASTM D 6474-99. All samples were prepared by dissolving 0.5-4.0 mg of polymer in 4 mL (at 140° C.) of stabilized TCB (same as mobile phase) and keeping for max. 3 hours at a maximum temperature of 160° C. with continuous gentle shaking prior sampling in into the GPC instrument.

As it is known in the art, the weight average molecular weight of a polymer composition can be calculated if the molecular weights of its components are known according to:

$$Mw_b = \sum_i w_i \cdot Mw_i$$

where $Mw_b$ is the weight average molecular weight of the polymer composition, $w_i$ is the weight fraction of component "i" in the polymer composition and $Mw_i$ is the weight average molecular weight of the component "i".

The number average molecular weight can be calculated using the well-known mixing rule:

$$\frac{1}{Mn_b} = \sum_i \frac{w_i}{Mn_i}$$

where $Mn_b$ is the number average molecular weight of the polymer composition, $w_i$ is the weight fraction of component "i" in the polymer composition and $Mn_i$ is the number average molecular weight of the component "i".

Notched Charpy Impact Strength

Charpy notched impact strength was determined according to ISO 179-1:2000 on notched specimens of 80×10×4 mm at a testing temperature of 23±2° C. Injection moulding of the impact specimens was carried out according to ISO 1873-2:2007.

Figure 1:
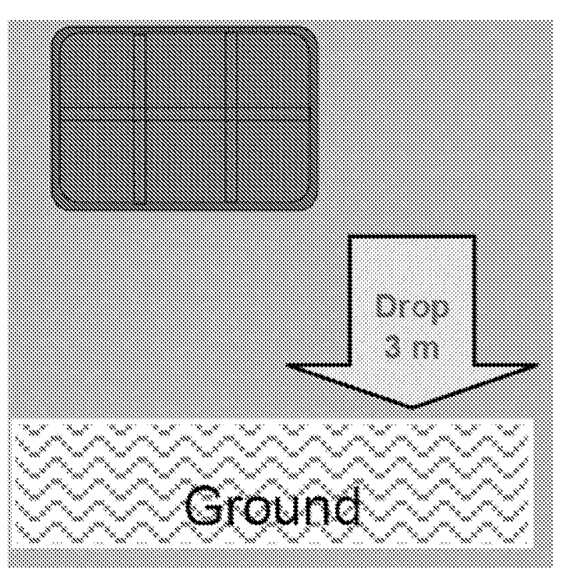

Edge Test: A test similar to corner drop test of EN ISO 8611 (1-3) (2012) standard is carried out in which the pallet is dropped once onto its edge (the longer edge if there is one) from a height of 3 m. Cracking is checked visually. Crack testing is carried out at room temperature. The FIGURE demonstrates the procedure.

Materials

The following commercial materials produced (supplied by Borouge) are used in the examples:

TABLE 1

| Materials | Comment | Density [kg/m3] | MFR2 190° C./ 2.16 kg [g/10 min] | MFR5 190° C./ 2.16 kg [g/10 min] |
|---|---|---|---|---|
| HE3460* | Multimodal high density polyethylene polymer | 960 | <0.1 | 0.4 |
| MB7581 | Multimodal high density polyethylene polymer | 958 | 4.0 | 14.0 |
| Component C2 | homopolymer of propylene | na | 9.1 (230 C.) | Na |

TABLE 1-continued

| Materials | Comment | Density [kg/m3] | MFR2 190° C./ 2.16 kg [g/10 min] | MFR5 190° C./ 2.16 kg [g/10 min] |
|---|---|---|---|---|
| Component C3 | Multimodal high density polyethylene polymer | 956 | 0.9 | 3.3 |
| Component C4 | Linear low density polyethylene | 923 | 0.3 | 0.9 |
| Component C5 | Heterophasic copolymer of propylene | na | 7.0 (230 C.) | na |

*contains carbon black more than 2 wt % and up to 4 wt %

Both the commercial grades HE3460 and MB7581 are supplied by Borouge and produced by conventional polymerisation methods using a conventional catalyst. The components C2-C5 are commercial and/or produced by conventional polymerisation methods using a conventional catalyst.

Inventive compositions IE1-IE3 and comparative compositions (CE1-CE10) were compounded in a commercial mixer using conventional compounding conditions. The compositions were comparable for each inv. and comparative composition. The polymer components and amounts thereof are disclosed in table 2. The compositions comprised comparable conventional additives in comparable amounts.

TABLE 2

| Nr. | Blend materials | MFR2 190° C./2.16 kg [g/10 min] | Charpy Test [J/m2] Spec: >8000 |
|---|---|---|---|
| 1 (IE1) | 80% MB7581 20% HE3460 | 2.5 | 10,839 |
| 2 (IE2) | 60% MB7581 40% HE3460 | 1.2 | 13,577 |
| 3 (IE3) | 40% MB7581 60% HE3460 | 0.5 | 14,166 |

| Nr. | Blend materials | MFR2 230° C./2.16 kg (or 190° C./2.16 kg [g/10 min] |
|---|---|---|
| 4 (CE1) | 55% MB7581 25% HE3460 20% C2 | 2.7 (190° C.) |
| 5 (CE2) | 63% MB7581 27% HE3460 10% C2 | 1.8 (190° C.) |
| 6 (CE3) | 55% C3 25% HE3460 20% C2 | 0.7 (190° C.) |
| 7 (CE4) | 100% C3 | 1.0 (190° C.) |
| 8 (CE5) | 90% C2 10% HE3460 | 6.5 |
| 9 (CE6) | 80% C2 20% HE3460 | 6.3 |
| 10 (CE7) | 90% C2 10% C4 | 1.8 |
| 11 (CE8) | 80% C2 20% C4 | 2.7 |
| 12 (CE9) | 90% C2 10% C5 | 10.7 |
| 13 (CE10) | 70% C2 30% C5 | 10.9 |

Polymer compositions of the invention/comparative examples are injection moulded into PP7 type pallets.
Pallet Dimensions and Tolerances, mm
Length 1300 (±5) Width 1100 (±5) Height 150 (±2)
Weight, Kg 12-18 kg, Double Deck
The formed pallets are tested and results presented in table 3.

TABLE 3

| Nr. | Blending materials | 1 × 3 m Edge Drop Spec: no crack | Nr. | Blending materials | 1 × 3 m Edge Drop [1 drop] Spec: no crack |
|---|---|---|---|---|---|
| 1 (IE1) | 80% MB7581 20% HE3460 | no crack | 8 (CE5) | 90% C2 10% HE3460 | crack |
| 2 (IE2) | 60% MB7581 40% HE3460 | no crack | 9 (CE6) | 80% C2 20% HE3460 | crack |
| 3 (IE3) | 40% MB7581 60% HE3460 | no crack | 10 (CE7) | 90% C2 10% C4 | crack |
| 4 (CE1) | 55% MB7581 25% HE3460 20% C2 | crack | 11 (CE8) | 80% C2 20% C4 | crack |
| 5 (CE2) | 63% MB7581 27% HE3460 10% C2 | crack | 12 (CE9) | 90% C2 10% C5 | crack |
| 6 (CE3) | 55% C3 25% HE3460 20% C2 | crack | 13 (CE10) | 70% C2 30% C5 | crack |
| 7 (CE4) | 100% C3 | crack | | | |

The invention claimed is:

1. A polymer composition comprising:
   a blend of two or more high density polyethylenes comprising:
      a first high density polyethylene having a density of at least 940 kg/m³ and an $MFR_2$ of 0.25 g/10 min or less; and
      a second high density polyethylene having a density of at least 940 kg/m³ and an $MFR_2$ of from 1.0 g/10 min to 20 g/10 min, and wherein the second high density polyethylene is multimodal and comprises from 30 to 70 wt % of a lower Mw component and from 70 to 30 wt % of a higher Mw component;
   wherein said polymer composition has an $MFR_2$ of from 0.25 to 15 g/10 min, and
   wherein the first high density polyethylene and the second high density polyethylene combined form at least 91 wt % of said polymer composition.

2. The polymer composition as claimed in claim 1, wherein the first high density polyethylene is multimodal.

3. The polymer composition as claimed in claim 1, wherein the polymer composition comprises less than 5 wt % of polypropylene.

4. The polymer composition as claimed in claim 1, wherein the first high density polyethylene forms from 10 to 70 wt % of the polymer composition and the second high density polyethylene forms from 30 to 90 wt % of the polymer composition.

5. The polymer composition as claimed in claim 1, wherein the density of the first high density polyethylene is from 945 to 965 kg/m³.

6. The polymer composition as claimed in claim 1, wherein the $MFR_5$ of the first high density polyethylene is from 0.1 to 0.9 g/10 min.

7. The polymer composition as claimed in claim 1, wherein the density of the second high density polyethylene is from 955 to 965 kg/m³.

8. The polymer composition as claimed in claim 1, wherein the $MFR_2$ of the second high density polyethylene is from 2.0 to 10.0 g/10 min.

9. The polymer composition as claimed in claim 1, wherein the density of the polymer composition is from 950 to 965 kg/m³.

10. The polymer composition as claimed in claim 1, wherein the $MFR_2$ of the polymer composition is from 0.4 to 6.0 g/10 min.

11. The polymer composition as claimed in claim 1, wherein the polymer composition further comprises from 0.2 to 9.0 wt % of a carbon black product.

12. The polymer composition as claimed in claim 1, wherein the polymer composition comprises:
   from 10 to 70 wt % of the first high density polyethylene;
   from 30 to 90 wt % of the second high density polyethylene;
   from 0 to 5 wt % additives; and
   from 0 to 9 wt % of a carbon black product.

13. The polymer composition as claimed in claim 1, wherein the $MFR_2$ according to ISO 1133 of the second high density polyethylene (HDPE) is from 2.0 to 8.0 g/10 min.

14. An article comprising the polymer composition as claimed in claim 1.

15. The article as claimed in claim 14, wherein said article is a pallet.

16. A pallet consisting of the polymer composition as claimed in claim 1.

17. A process for the preparation of an article as claimed in claim 14, the process comprising blending the first high density polyethylene and the second high density polyethylene to form the polymer composition and moulding the polymer composition to prepare said article.

18. A method of use of the polymer composition as claimed in claim 1, the method comprising using the polymer composition in the manufacture of an article.

19. The method of use according to claim 18, wherein said article is a pallet.

20. A pallet comprising a polymer composition, the polymer composition comprising:
   a blend of two or more high density polyethylenes comprising:
      a first high density polyethylene having a density of at least 940 kg/m$^3$ and an $MFR_2$ of 0.25 g/10 min or less; and
      a second high density polyethylene having a density of at least 940 kg/m$^3$ and an $MFR_2$ of from 1.0 g/10 min to 20 g/10 min, and wherein the second high density polyethylene is multimodal and comprises from 30 to 70 wt % of a lower Mw component and from 70 to 30 wt % of a higher Mw component;
   wherein said polymer composition has an $MFR_2$ of from 0.25 to 15 g/10 min, and
   wherein the first high density polyethylene and the second high density polyethylene combined form at least 91 wt % of said polymer composition.

* * * * *